Patented Oct. 15, 1929

1,732,120

UNITED STATES PATENT OFFICE

ALFRED CHRISTEN, OF BASEL, SWITZERLAND

HAIR TONIC

No Drawing. Application filed January 14, 1927, Serial No. 161,245, and in Germany January 21, 1926.

The object of the present invention is the provision of a preparation or composition to be used to promote the growth of the hair.

Subject matter of the present invention is the observation that ketones containing at least one aliphatic-aromatic group have the effect to promote the growth of the hair.

As examples of such ketones there may inter alia be mentioned the following:—

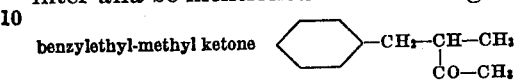

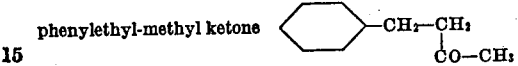

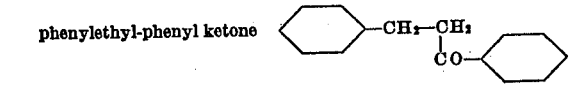

as well as their homologues and nucleal substitution products, such as, for instance,

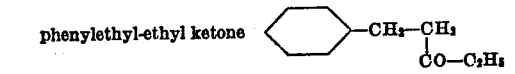

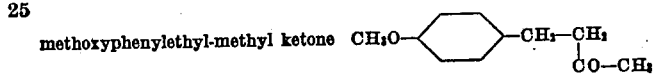

furthermore unsaturated aliphatic-aromatic ketones, such as

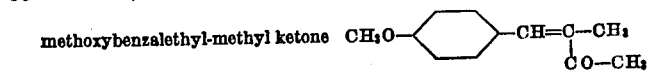

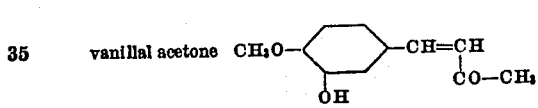

and so on.

The application of these ketones may be accomplished with or without a solvent or diluent, as well as in form of salves and other preparations, by spreading same on or rubbing same into the scalp. As particularly suitable for this purpose there has been found for instance a solution of the ketone or mixture of ketone, respectively, in dilute alcohol, to which solution other solvents may, in suitable quantities, be added, if desired, such as, for example, ethyl acetate. To these preparations there may yet be added, if required, odoriferous substances, essential oils and other substances in general use in cosmetics. The ketones may further be applied in mixture with known tonics promoting the growth of the hair, such as for instance pilocarpine, nettle extract etc.

Having thus fully described my invention, what I claim as new and desired to secure by Letters Patent of the United States is:—

1. A preparation for promoting the growth of hair containing at least one ketone having at least one aliphatic-aromatic group.

2. A preparation for promoting the growth of hair containing at least one ketone of the formula

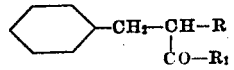

wherein R means H or a monovalent hydrocarbon radical and $R_1$ a monovalent hydrocarbon radical.

3. A preparation for promoting the growth of hair containing the ketone of the formula

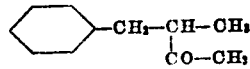

In witness whereof I have hereunto signed my name this 4th day of January, 1927.

ALFRED CHRISTEN.